United States Patent [19]

Dorer

[11] 3,936,993

[45] Feb. 10, 1976

[54] ENVELOPE FILLING MACHINE

[75] Inventor: Wilfried Dorer, Rebberg, Germany

[73] Assignee: Mathias Bauerle GmbH, St. Georgen, Black Forest, Germany

[22] Filed: July 5, 1974

[21] Appl. No.: 485,944

[52] U.S. Cl. .................. 53/266 A; 53/188; 53/376; 198/20 R; 198/110; 271/3; 271/184; 271/DIG. 9

[51] Int. Cl.² ...................... B65B 7/20; B65G 47/52

[58] Field of Search .................. 271/DIG. 9, 184, 3; 198/20 R, 20 T, 21, 27, 94, 99, 110; 53/266 A, 188, 38, 377, 376, 285

[56] References Cited

UNITED STATES PATENTS

| | | | |
|---|---|---|---|
| 499,460 | 6/1893 | Hooper | 198/20 T |
| 2,839,880 | 6/1958 | Boughton | 53/266 A |
| 2,993,582 | 7/1961 | Souser | 198/27 X |
| 3,568,401 | 3/1971 | Bonsch | 53/266 A |
| 3,844,402 | 10/1974 | Hayashi | 198/20 R |

*Primary Examiner*—Travis S. McGehee
*Assistant Examiner*—Horace M. Culver
*Attorney, Agent, or Firm*—Sol L. Goldstein

[57] ABSTRACT

An envelope filling machine including conveyor apparatus for transporting individual envelopes from a feed station to a filling station for receiving an insert therein. Positioned intermediate the feed and the filling stations there is provided a spreading device for opening the mouth of the envelope and a dampener device for moistening the gummed flap of the envelope. The conveyor apparatus is arranged to transport an envelope to the filling station in a feeding direction in a first transport plane and, in response to completion of an envelope stuffing operation, the conveyor apparatus is pivoted into a second transport plane inclined downwardly towards the feed station. A drive means is provided for driving the conveyor apparatus in the feeding direction to advance the envelope to the filling station and, alternately, driving the conveyor means in the opposite direction, in response to movement of the conveyor apparatus to the inclined position, for transporting the stuffed envelope from the filling to a discharge station.

13 Claims, 5 Drawing Figures

ENVELOPE FILLING MACHINE

BACKGROUND OF THE INVENTION

In a known prior art device of this general kind as shown, for example, in German Pat. Publication Application No. 1,761,792, the conveyor means at the filling station is swingable into a downwardly inclined position in response to the arrival of an envelope at the filling station. On completion of an envelope stuffing operation, and in response to a setting device, the conveyor means is pivoted in the opposite direction so as to provide a downwardly inclined transport for conveying the stuffed envelope from the filling station in the same direction in which the envelope was transported to the filling station. This opposite position of inclination of the conveyor means for discharging the envelope from the filling station relies on the weight of the envelope, conveyed with its flap at the lead edge, for movement of the envelope by gravity from the inclined conveyor means to a pair of rollers for closing and sealing the flap of the envelope. However, because the envelope is conveyed with the flap thereof facing upwardly and at the lead edge, in order to close the flap against the body of the envelope prior to a flap sealing operation, the prior art device additionally resorts to an air blast for moving the envelope flap towards a closed position.

In this prior device, as a result of the air blast acting against the stuffed envelope on the inclined conveyor means the envelope will, at times, be held against movement on the inclined conveyor means by the air blast applied to the envelope. In other instances, while the envelope may not be held against movement, the air blast often retards discharge of the stuffed envelope from the conveyor means thereby slowing down and disturbing the machine operation as a whole. Moreover, since the envelope is fed with the flap at its lead end and the flap only is gripped to hold the envelope for a stuffing operation at the filling station, and because the flimsy and limp nature of the flap does not lend itself to positive gripping action, the envelope may be improperly positioned or shifted out of position at the filling station thereby further hampering proper operation of the machine.

SUMMARY OF THE INVENTION

The present invention relates to a device for transporting envelopes in a feeding direction in a first plane to a filling station of an envelope stuffing machine, and for transporting the envelopes from the filling station in a direction opposite to the feeding direction in a different plane.

It is an object of the present invention to provide a conveyor apparatus for transporting an envelope in a first transport plane and direction to advance the envelope to the filling station, and to position the conveyor apparatus in a second transport plane and to drive the conveyor apparatus in the opposite direction for transporting a stuffed envelope from the filling station.

Another object of the invention is to provide a conveyor means in which only a minimum amount of movement is required for positioning the conveyor means between the first and the second transport planes to thereby provide a machine of compact construction.

A further object of the invention is to provide an envelope transport means in which the envelope is transported to and from the filling station by a single conveyor means to afford controlled guided movement to the envelope during each phase of envelope transport with substantial assurance that uncontrollable chance events will not adversely effect the operation of the machine.

A further object of the invention is to provide alternately operable forward and reverse conveyor drive means at one end of the transport plane ahead of the filling station, and pivotal support means at the other end of the transport plane beyond the filling station for movement of the conveyor means between the first and the second transport planes and alternate engagement of the forward and reverse drive means, to thereby provide a minimum distance of travel of the envelope by transporting the envelope in a discharge direction opposite to the direction of envelope transport to the filling station.

A still further object of the invention is to provide a feed roller for advancing an envelope to the conveyor means and for, in cooperation with a pressure roller, sealing the flap of the envelope as it is delivered from the filling station through the nip of the rollers. This arrangement of a single roller performing a dual function further aids in the contruction of a compact device and, of course, eliminates the requirement of an additional roller for effecting an envelope flap sealing operation.

A further object of the invention is to provide a drive means for driving the conveyor means alternately in forward (feed) and reverse (discharge) directions by engaging the drive means for forward feed of the envelope when the conveyor means is in the first transport plane, and for engaging the drive means for reverse feed in response to movement of the conveyor means to the second transport plane.

Other objects, features and advantages will appear hereinafter as the description proceeds.

IN THE DRAWING

DESCRIPTION OF THE PREFERRED EMBODIMENT

Figure 1:
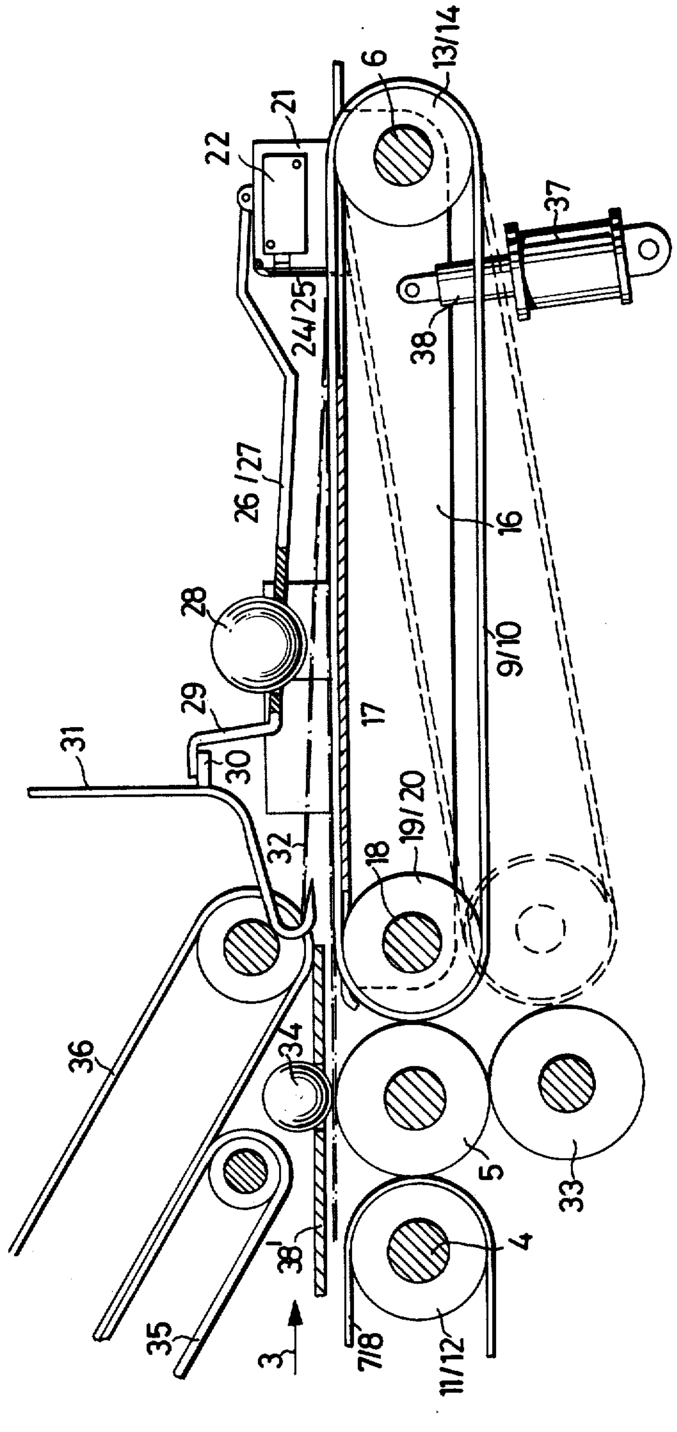
FIG. 1 is a front elevation in section, partially broken away, of an envelope filling machine and showing in full lines a conveyor means for transporting an envelope to a filling station and showing in phantom the position of the conveyor means for discharging the envelope from the filling station in accordance with the present invention.
Figure 2:
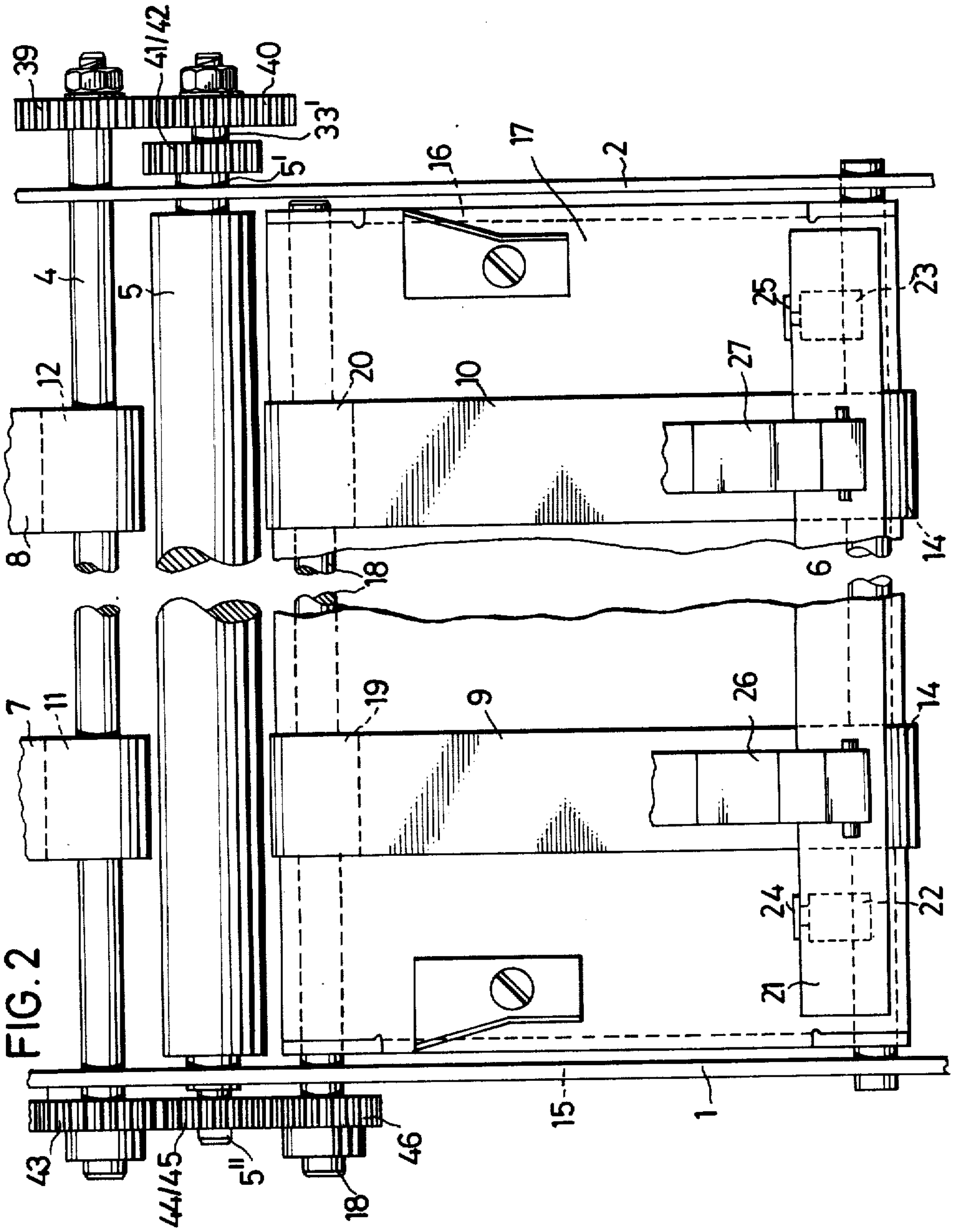
FIG. 2 is a plan view of the conveyor means of FIG. 1.
Figure 3:
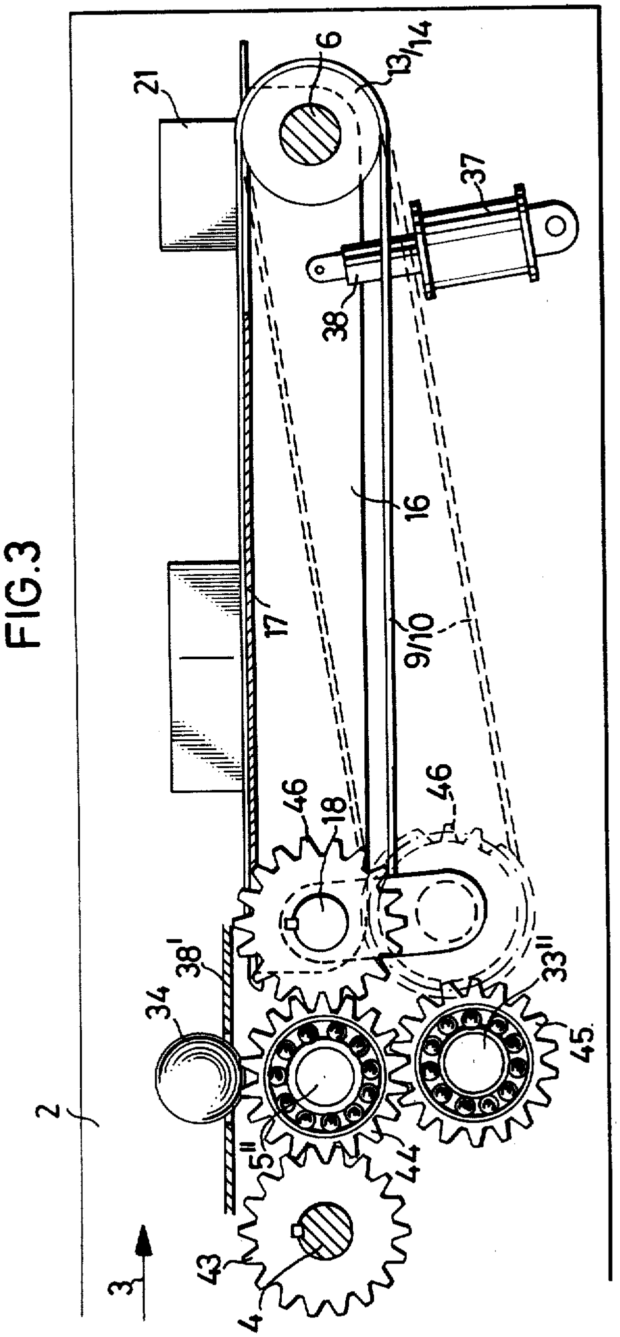
FIG. 3 is a front elevation, partially in section, showing a drive means for alternately driving the conveyor means in opposite directions.
Figure 4:
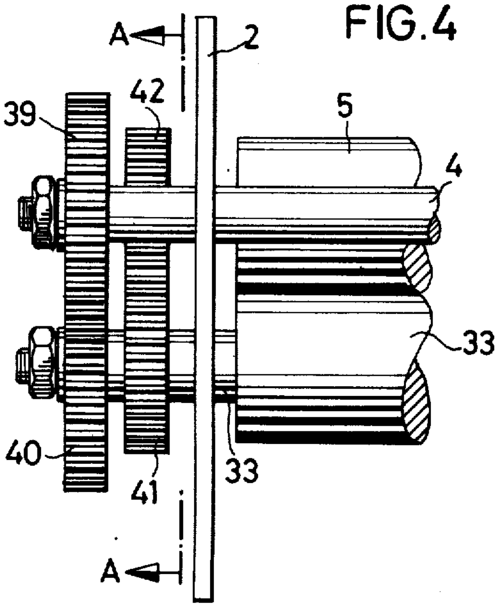
FIG. 4 is an end view of a drive means for operating a pair of rollers for sealing the flap of the envelope.
Figure 5:
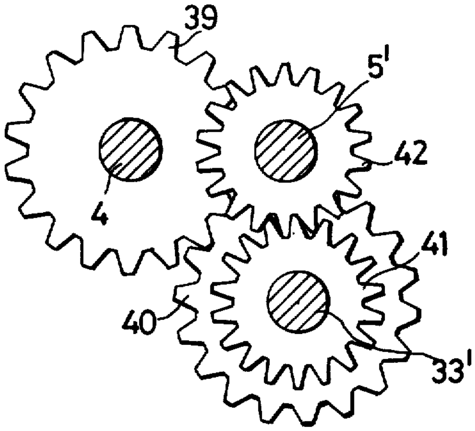
FIG. 5 is a section taken substantially along the plane designated by line A—A of FIG. 4.

As shown in FIGS. 1, 2 and 3 the envelope conveyor apparatus includes a pair of side plates 1 and 2 supported on a frame of the machine (not shown in the drawing) and extending longitudinally in a direction of envelope transport to a filling station, as indicated by arrow 3. The side plates 1 and 2 rotatably support a power drive shaft 4, a feed roller 5 and a conveyor belt support shaft 6 in laterally spaced relationship in an aligned plane. As best shown in FIG. 1 and 2, the power drive shaft 4 is provided with a pair of axially spaced pulleys 11 and 12 for supporting a pair of feed belts 7 and 8 respectively. A similar pair of pulleys 13 and 14 are provided on the conveyor belt support shaft 6, in alignment with the pulleys 11 and 12, for guiding and supporting a pair of endless conveyor belts 9 and 10 respectively.

As best shown in FIGS. 1, 2 and 3, there is provided an envelope conveyor apparatus comprising a support plate 17 having a pair of depending side walls 15 and 16. The support plate 17 is positioned between the side plates 1 and 2 and is mounted for controlled pivotal movement on the conveyor belt support shaft 6. The support plate 17 as shown in the position of FIG. 1 defines a first transport plane for transporting an envelope 32 from a first end to a second end at the filling station and, when pivoted to an inclined position of the conveyor belts 9 and 10 shown in phantom in FIG. 1, defines a second transport plane for transporting the stuffed envelope from the second end to the first end in a discharge direction opposite to the direction of envelope feed. The front end of the support plate 17, opposite the pivoted end thereof, is supported on a conveyor drive shaft 18 rotatably mounted in the side walls 15 and 16 of the support plate 17. The conveyor drive shaft 18 is also provided with a pair of pulleys 19 and 20, in axial alignment with the pulleys 13 and 14, for supporting and driving the endless conveyor belts 9 and 10 respectively.

With reference to FIGS. 1 and 2 there is shown a housing 21 secured to the support plate 17 and extending transversely to the direction of envelope feed. The housing 21 supports a pair of spaced apart contact switches 22 and 23 provided with stop tongues 24 and 25 respectively. The housing 21 also supports a pair of pivotable levers 26 and 27 positioned in alignment with the conveyor belts 9 and 10 respectively. Each of the levers 26 and 27 is provided with a ball 28 (only one ball shown in FIG. 1 of the drawing) which rests lightly and rotatably on the envelope 32 at the filling station or, in the absence of an envelope at the filling station, on the conveyor belts 9 and 10. The levers 26 and 27 support the balls 28 for movement into and out of contact engagement with the envelope 32 at the filling station.

As shown in FIG. 1, each of the levers 26 and 27 is provided with an angled front end 29 resting on a projection 30 provided on each of a pair of spreading fingers 31. The spreading fingers 31 are movable between lowered and raised positions for opening the mouth of the envelope 32 for a stuffing operation. As the spreading fingers 31 are moved to the raised position for opening the mouth of the envelope 32 the projections 30 acting against the angled ends 29 of the levers 26 and 27 pivot the levers 26 and 27 in a clockwise direction as viewed in FIG. 1, to thereby lift the balls 28 out of engagement with the envelope 32 at the filling station. Thereafter, as the spreading fingers 31 are moved to their lowered position the balls 28 are again lowered into guiding and supporting contact with the envelope.

Still referring to FIG. 1, the feed roller 5 is in rolling engagement with a pressing roller 33 for sealing the flap of the envelope as it is fed from the filling station between the nip of the rollers 5 and 33. The feed roller 5 is also in rolling engagement with a ball 34 rotatably supported in a guide plate 38' for guiding the envelope in its transport by the belts 7 and 8 to the belts 9 and 10 of the conveyor apparatus. The inserts to be stuffed into the envelope 32 at the filling station are delivered by means of a pair of coacting belts 35 and 36 also shown in FIG. 1.

With reference to FIGS. 1 and 3, the support plate 17 and the conveyor drive shaft 18 are shown in full line positions in which the support plate 17 lies in a horizontal first transport plane for advancing to and supporting the envelope 32 at the filling station, while the conveyor belts 9 and 10 and thus the support plate 17 and the conveyor drive shaft 18 as shown in the dotted line positions define an inclined second transport plane, in alignment with the nip of the feed roller 5 and the pressing roller 33, for transporting the stuffed envelope from the filling station in a discharge direction.

The support plate 17 of the conveyor apparatus is pivoted from the first to the second transport plane, in timed relationship with each envelope feeding cycle, by means of a solenoid 37 having a plunger 38 secured to one of the side walls 15 or 16 of the support plate 17. Although not shown in the drawing, conventional spring means may be utilized for restoring the conveyor means including the support plate 17 from the inclined position to the first transport plane.

With reference to FIGS. 1, 3, 4 and 5, the drive means for the feed roller 5 and the pressing roller 33 comprises a train of gear wheels 39, 40, 41 and 42. The power driven gear 39 is fixed on the power drive shaft 4 and is driven in a clockwise direction as viewed in FIG. 5 in meshing engagement with the gear wheel 40 fixed on a shaft extension 33' of the pressing roller 33. The gear 41 is also fixed on the shaft extension 33' and meshes with the gear 42 fixed on a shaft extension 5' of the feed roller 5. Thus, as viewed in FIGS. 1 and 5, the meshing gears 39 and 40 rotate the pressing roller 33 in a counterclockwise direction and the meshing gears 41 and 42 rotate the feed roller 5 in a clockwise direction, thereby rotating the feed roller 5 in a direction to advance the envelope to the filling station and rotating the pressing roller 33 in the opposite direction to transport the envelope to the discharge station and sealing the flap of the envelope as it passes through the nip of the rollers 5 and 33.

With reference now to FIGS. 2 and 3 there is shown a drive means for the conveyor drive shaft 18 for driving the conveyor belts 9 and 10 comprising gear wheels 43, 44, 45 and 46 positioned at the side of the support plate 17 opposite the gear wheels 39–42 described hereinabove. The power driven gear wheel 43 is fixed on the power drive shaft 4 and is in mesh with idler gear 44 which is mounted for free rotation on a shaft extension 5'' of the feed roller 5. The idler gear 44, in turn, meshes with idler gear 45 also mounted for free rotation on a shaft extension 33'' of the pressing roller 33. The gear wheel 46 is rotatable in opposite directions, is fixed on the conveyor drive shaft 18 and is pivotally movable between a drive position in mesh with the idler gear 44 when the conveyor means is in the first transport plane, and a drive position in mesh with the idler gear 45 when the conveyor means is positioned in the inclined second transport plane.

With the support plate 17 in the first transport plane, the gear wheel 46 meshes with the idler gear 44 and thus is driven in a clockwise direction, as viewed in FIG. 3, to drive the conveyor belts 9 and 10 to advance an envelope 32 from a feed station towards the filling station. In response to pivotal movement of the support plate 17 to the inclined second transport plane, the gear wheel 46 is moved out of engagement with the idler gear 44 and into meshing relation with the idler gear 45. In this position the gear wheel 46 is driven in a counterclockwise direction and the conveyor belts 9 and 10 are driven in the opposite direction to thereby transport the envelope from the filling station to the nip of the feed roller 5 and the pressing roller 33 for said sealing the flap of the stuffed envelope.

In an envelope feeding cycle the conveyor belts 9 and 10 are driven in a clockwise direction through the gear train 43, 44 and 46 to advance the envelope 32 to the filling station and the lead edge of the envelope against the stop tongues 24 and 25 of the contact switches 22 and 23. Activation of the contact switches 22 and 23 by the lead edge of the envelope 32 de-energizes the means (not shown) for driving the power drive shaft 4 and the feed belts 7 and 8, the feed roller 5, the pressing roller 33 and the conveyor belts 9 and 10. Thereafter, the spreading fingers 31 are actuated to open the mouth of the envelope 32 and simultaneously pivot the levers 26 and 27 to lift the balls 28 from engagement with the envelope. At this point the conveyor belts 35 and 36 deliver an insert into the envelope and the spreading fingers 31 are withdrawn from the mouth of the envelope. In response to the stuffing of the envelope, the solenoid 37 is energized and pivots the conveyor means to the inclined second transport plane thereby engaging the gear 46 with the idler gear 45 which, though the gear train 43, 44, 45 and 46, drive the conveyor belts 9 and 10 and transport the stuffed envelope in a reverse or discharge direction. Energization of the solenoid 37 also restores the drive to the power drive shaft 4 for driving the conveyor belts 7 and 8 for a subsequent envelope feeding cycle.

In the movement of the conveyor apparatus from the first to the second transport plane the gear wheel 46 which was in mesh with the idler gear 44 to provide forward feed of the envelope is now in mesh with the idler gear 45 and, therefore, is driven in the opposite direction to transport the envelope in a discharge direction from the filling station. Also, as the spreading fingers 31 move out of the mouth of the envelope they also effect lowering of the levers 26 and 27 to place the balls 28 into contact engagement with the stuffed envelope to provide the required friction between the envelope and the conveyor belts 9 and 10 to assure positive guided movement of the stuffed envelope in its conveyance from the filling station and to facilitate withdrawal of the envelope flap from the nip of the feed roller 5 and the ball 34. The balls 28 acting against the envelope withdraw the flap from the nip and hold the envelope against the conveyor in the second transport plane. Movement of the support plate to the first transport plane restores the levers to the raised position of FIG. 1 where they are retained by the spreading fingers 31.

Thus, there is provided a conveyor apparatus for advancing a sheet or an envelope between multiple pairs of work stations wherein first and second work stations are at separate locations. The conveyor assembly provides an integrated unit linking the first pair of work stations and is pivotable about one end thereof to a position to link the second pair of work stations. The drive means drives the conveyor assembly in one direction when the conveyor assembly links-up with the first pair of work stations and reverses the drive when the conveyor assembly links-up with the second pair of work stations.

From the foregoing, it will be appreciated that the present invention provides a compact conveyor apparatus for transporting individual envelopes from a feed station to a filling station of an envelope stuffing machine and then to a discharge station. The arrangement of the drive means for advancing the envelope in a first direction to the filling station and in a reverse direction to the discharge station, together with the first and the second transport planes for transporting an envelope to and from the filling station in opposite directions, provides for a minimum only of envelope travel thereby assuring positive guided movement of the envelope and reliable machine operation. Additionally, the gear drive train provides a simple but effective means for driving the feed roller in a direction to advance the envelope to the filling station, driving the conveyor belts alternately in opposite directions and driving the pressing roller in a reverse direction. Thus, the feed roller not only advances the envelope but also coacts with the pressing roller for discharging or ejecting the stuffed envelope and sealing the flap of the envelope as the envelope passes through the nip of the roller pair.

What is claimed is:

1. A conveyor apparatus for transporting an envelope from a feed station to a filling station of an envelope stuffing machine and for transporting a stuffed envelope from the filling station to a discharge station, comprising:

- a support plate movable between a first and a second transport plane for supporting the envelope in its transport to and from the filling station;
- conveyor means including an endless belt having an upper run thereof overlying the support plate for advancing the envelope from a first end of the first transport plane to a second end thereof at the filling station, and for advancing the stuffed envelope from the second end to a first end of the second transport plane;
- mounting means for supporting the support plate for controlled pivotable movement between the first and the second transport planes;
- means for moving the support plate from the first to the second transport plane in response to the presence of a stuffed envelope at the second end of the first transport plane;
- retainer means mounted on the support plate and movable therewith between an inactive position and an active position for holding the stuffed envelope against the conveyor means during movement of the support plate from the first to the second transport plane; and
- drive means for driving the conveyor means in one direction when the support plate is in the first transport plane and for driving the conveyor means in an opposite direction in response to movement of the support plate to the second transport plane.

2. A conveyor apparatus as set forth in claim 1 in which the drive means comprises a first and a second drive means;

- said conveyor means alternately driven by the first and the second drive means for transporting the envelope to and from the filling station;
- said first drive means mounted on the support plate at one end thereof and movable with the support plate between the first and the second transport planes; and
- said second drive means operatively engageable by the first drive means for alternately driving the conveyor means in the said one and the said opposite directions.

3. A conveyor apparatus as set forth in claim 1 which further includes a driven feed roller in rolling engagement with a pressing roller to provide therebetween a roller nip in alignment with the second transport plane of the conveyor means for receiving the stuffed envelope being transported from the filling station and sealing a flap of the envelope passing through the roller nip.

4. A conveyor apparatus as set forth in claim 2 in which the first drive means includes a first gear wheel alternately rotatable in opposite directions, and the second drive means includes a first pair of meshing idler gear wheels each rotatable in one direction only;

whereby the first gear wheel meshes with one and alternately the other of the first pair of idler gear wheels for driving the conveyor means in either of the said directions in response to movement of the support plate between the first and the second transport planes.

5. A conveyor apparatus as set forth in claim 1 in which the first transport plane extends in a horizontal path and the second transport plane extends in a path inclined downwardly in the direction of the first end of the second transport plane.

6. A conveyor apparatus as set forth in claim 1 in which the means for moving the support plate comprises actuable means energizable by a switch means for moving the support plate from the first to the second transport plane by activation of the switch means in response to the presence of a stuffed envelope at the second end of the first transport plane.

7. A conveyor apparatus as set forth in claim 6 which includes resilient means for restoring the support plate from the second to the first transport plane by deenergization of the actuable means in response to transport of the stuffed envelope from the second end to the first end of the second transport plane.

8. A conveyor apparatus as set forth in claim 4 which further includes a driven feed roller in rolling contact with a driven pressing roller;

a third drive means including one of the second pair of meshing gear wheels fixed on the feed roller, and a second gear wheel and the other of the second pair of gear wheels fixed on the pressing roller; and a pair of power driven gear wheels one of which is in mesh with one of the first pair of idler gear wheels of the second drive means and the other of the said pair of power driven gear wheels in mesh with the second gear wheel of the third drive means for driving, respectively, the first and the second drive means alternately in opposite directions, and for driving the third drive means in a single direction only.

9. A conveyor apparatus as set forth in claim 8 in which the first gear wheel of the first drive means is fixed on a drive shaft for supporting and driving the conveyor means in said one direction in response to meshing engagement of the first gear wheel with said one of the first pair of idler gear wheels of the second drive means, and for driving the conveyor means in the opposite direction in response to meshing engagement of the first gear wheel with the other idler gear wheel of the second drive means.

10. A conveyor apparatus as set forth in claim 9 in which the said one of the pair of power driven gear wheels drives the drive shaft and the said other of the pair of power driven gear wheels drives the pressing roller.

11. An apparatus for advancing sheet material between a feed and a filling station defining a first pair of work stations and between the filling and a discharge station defining a second pair of work stations in a processing machine wherein the first and second pairs of work stations are at separate locations, comprising:

a support plate linking said first pair of the work stations, said support plate being an integrated unit and adapted to pivot about one end thereof at one of the work stations;

conveyor means including an endless belt having an upper run thereof overlying the support plate for advancing sheet material;

means for pivoting the support plate to link the second pair of work stations;

retainer means pivotally mounted on the support plate and movable therewith for holding the sheet material against the conveyor means when the support plate links-up the second pair of work stations; and drive means for driving the conveyor means in one direction when the support plate links-up the first pair of work stations and for reversing the drive when the support plate links up the second pair of work stations.

12. An apparatus as set forth in claim 1 in which the retainer means is restored to the inactive position by the support plate in its movement from the second to the first transport plane.

13. An apparatus as set forth in claim 1 in which the retainer means comprises:

a lever arm having one end pivotally mounted on the support plate and extending in alignment with the endless belt with its other end terminating adjacent the filling station;

releasable retaining means for holding the lever means at a position spaced above the envelope at the filling station when the support plate is in the first transport plane, and for releasing the lever arm for pivotal movement with the support plate; and weight means carried by said other end of the lever means for pivoting the lever means and holding the stuffed envelope against the conveyor means in response to release of the lever means.

* * * * *